(No Model.)

C. F. HORNBECK.
POTATO DIGGER.

No. 318,113. Patented May 19, 1885.

WITNESSES

INVENTOR
Cornelius F. Hornbeck
by C. H. Watson & Co
Attorney

UNITED STATES PATENT OFFICE.

CORNELIUS F. HORNBECK, OF OWEGO, NEW YORK, ASSIGNOR TO CARRIE E. HORNBECK, OF SAME PLACE.

POTATO-DIGGER.

SPECIFICATION forming part of Letters Patent No. 318,113, dated May 19, 1885.

Application filed March 19, 1885. (No model.)

*To all whom it may concern:*

Be it known that I, CORNELIUS F. HORNBECK, of Owego, in the county of Tioga and State of New York, have invented certain new and useful Improvements in Potato-Diggers; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention has relation to improvements in potato diggers and separators; and it consists in the novel construction and arrangement of parts, as will be hereinafter described, and particularly pointed out in the claims.

Figure 1:
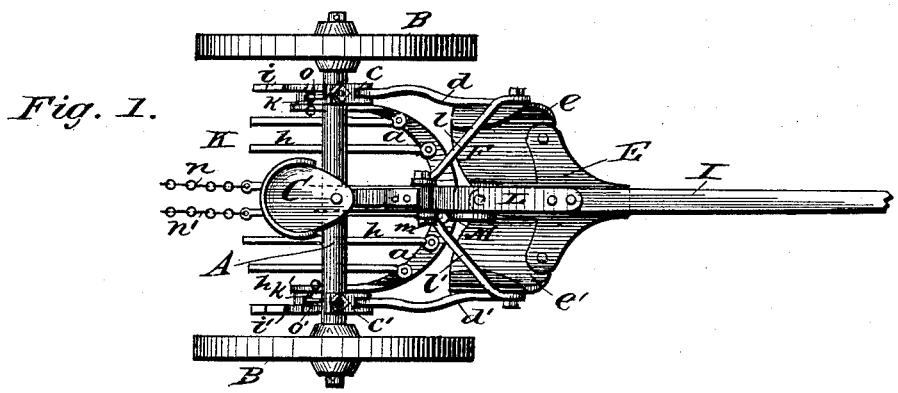
Figure 2:
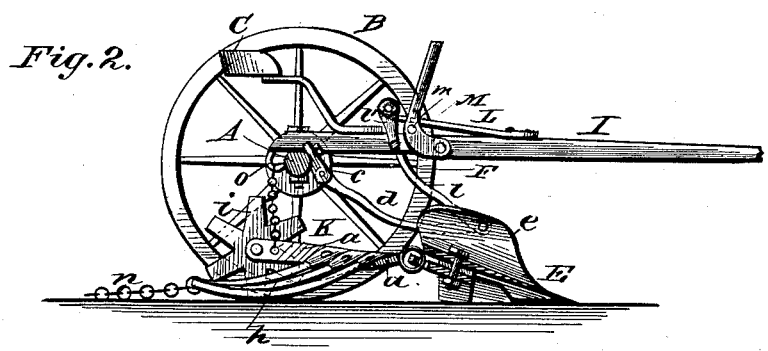
Figure 3:
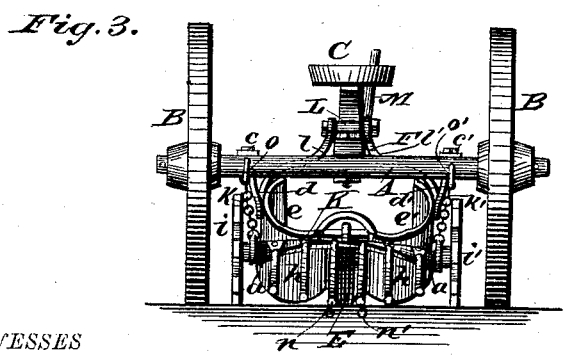

In the accompanying drawings, Figure 1 is a top plan view of my invention. Fig. 2 is a central vertical section, and Fig. 3 is a rear elevation, of the same.

The letter A represents the axle of my improved potato digger and separator, and B the wheels thereof, and mounted on the central portion of said axle is the tongue I, having near its rear part the driver's seat C.

E denotes a shovel-plow, to which are secured at its sides, in any suitable manner, upturned or curved wings $e$ and $e'$, having attached to their outer faces the outer ends of arms $d$ and $d'$, the inner ends of which are hinged to the axle A by means of bearing lugs or clevises $c$ and $c'$ on the front portion thereof.

F designates a bail, formed of arms $l$ and $l'$, having their lower ends bolted to the wings $e$ and $e'$ on the outer ends of the arms $d$ and $d'$, while the upper ends of said arms $l$ and $l'$ are connected together above the tongue I by a bolt, on which is wound one end of a spring, L, the other end of this spring being secured to the tongue, for a purpose hereinafter explained.

The letter K represents the separator, consisting of a frame, $a$, made in U-shape form, and provided with longitudinal curved or bent rods or teeth $h$, secured to the front portion of said frame at suitable distances apart, and this frame is secured at its central front portion in a flexible manner to the rear portion of the shovel-plow, as shown in the drawings. The rear ends of the frame $a$ are provided with journals or spindles, on which are mounted toothed agitating-wheels $i$ and $i'$, which are adapted to rotate on the ground and support and agitate the separator when traveling over the same. This frame $a$ is also provided with perforations, in which are attached the lower ends of chains $k$ and $k'$, while the upper ends of these chains are attached to hooks $o$ and $o'$ on the rear part of the axle, for the purpose of keeping the separator from having a sidewise movement when traveling over the ground, and these chains are also for the purpose of swinging the separator and its wheels out of contact with the ground when said separator is not in use.

On one side of the tongue I, and pivoted thereto, is a lever, M, having an arm, $m$, at right angles thereto, which rests and has its bearing on the under side of said spring L, and when the lever is pressed downward this arm works backward and forward under the spring, for the purpose of raising or lowering the shovel-plow to or from the ground, as the case may be.

To the two central teeth of the separator are attached chains $n$ and $n'$, which trail along on the ground in rear of the separator and perform the function of cleaning the earth from the potatoes as they fall from the separator.

I attach importance to the fact that the spring L serves a double function, one of which is the raising of the plow from the ground or lowering the same by means of the armed lever M. The other function is, that said spring allows the plow to have an easy vertical movement when the same is in use. The toothed separator-frame $a$ is pivoted at its forward end, and supported by chains $k$ $k'$ from the axle. The toothed wheels $i$ $i'$ give a vibrating motion to the frame, and the chains, being readily adjusted, allow the amount of this vibration to be regulated at will by raising or lowering the said frame by means of the chains before mentioned.

Having now fully described my invention, what I claim is—

1. In a potato-digger, the combination, with the plow having the bail F, provided with a spring, L, secured to the tongue, the arms $d$ $d'$, pivoted to the axle and secured to the plow, of the lever M, having the arm $m$ resting under said spring to raise and lower the plow, said spring also serving to allow said plow a vertical movement, as shown and described, and for the purpose set forth.

2. The combination, with the separator-frame pivoted at its front portion and having toothed wheels $i\ i'$ journaled thereon, of the chains $k\ k'$, supporting the rear end of the frame from the axle and adjustable to vary the vibration of said frame, as set forth.

In testimony that I claim the foregoing as my own I have hereto affixed my signature in presence of witnesses.

CORNELIUS F. HORNBECK.

Witnesses:
 T. B. OAKLEY,
 GEO. A. INGERSOLL,
 TIMOTHY B. OAKLEY.